May 17, 1949.  R. WARRENDER  2,470,448
BOBSLED
Filed Dec. 23, 1946
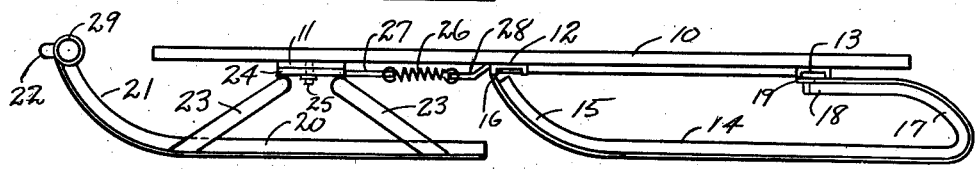
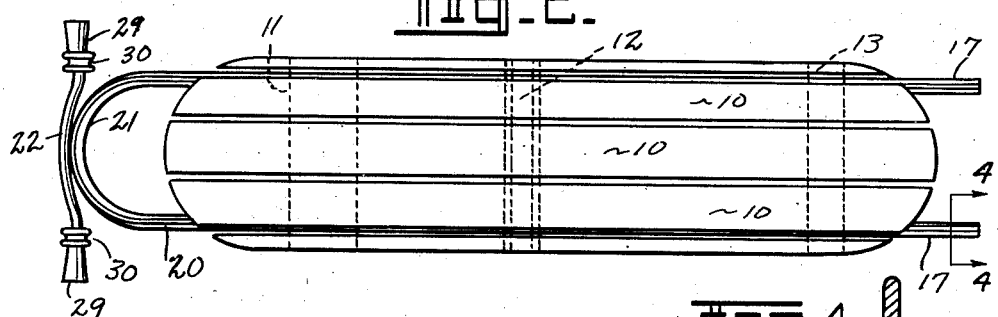
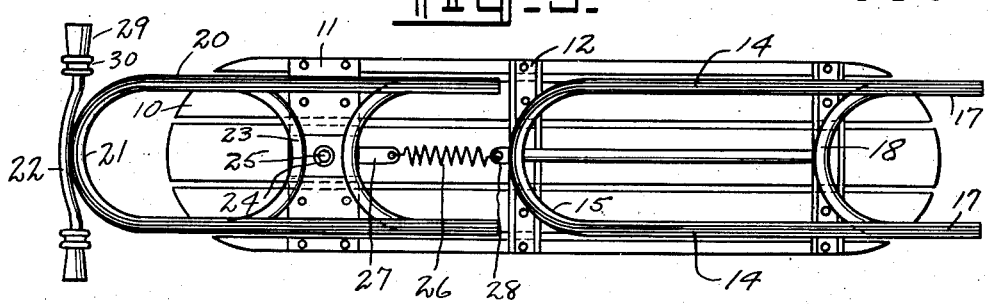
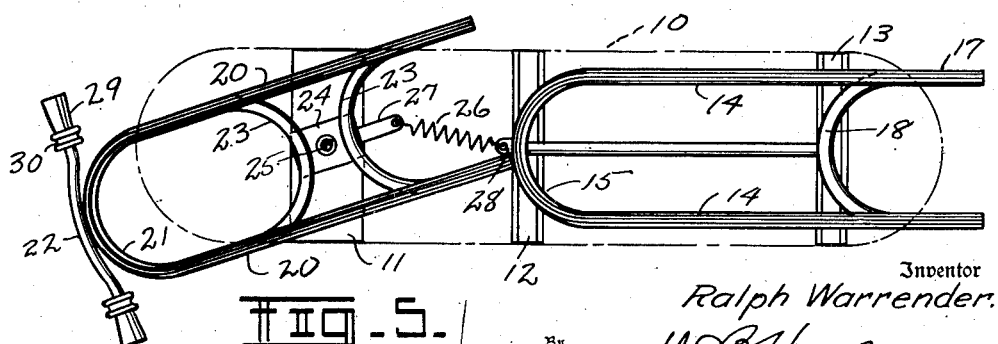
Inventor
Ralph Warrender.
W.B. Harpman
Attorney Patented May 17, 1949

2,470,448

UNITED STATES PATENT OFFICE 2,470,448

BOBSLED

Ralph Warrender, Sharon, Pa.

Application December 23, 1946, Serial No. 718,011

1 Claim. (Cl. 280—16)

This invention relates to a sled and more particularly to a bobsled in which a seat unit is supported by two runner units.

The principal object of the invention is the provision of a steerable double runner unit sled.

A further object of the invention is the provision of a sled having a single seat section and a fixed runner unit supporting a portion thereof and a secondary steerable runner unit pivotally affixed thereto.

A still further object of the invention is the provision of a bobsled construction incorporating resilient means for normally holding the runner units in axial alignment.

A still further object of the invention is the provision of a bobsled of a size and design similar to a conventional fixed runner sled.

The bobsled shown and described herein has been designed to form a simple and efficient toy for a child and emphasis has been made on light weight construction, the formation of the component parts of shapes insuring the durability of the sled and enabling it to withstand rough treatment. The bobsled comprises a seat portion having a fixed runner section and a steerable separate pivoted runner section.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side view of the bobsled.

Figure 2 is a top plan view of the bobsled.

Figure 3 is a bottom view of the bobsled.

Figure 4 is an enlarged cross section of one of the runner sections of the bobsled.

Figure 5 is a bottom view of the runner portions of the bobsled showing the steerable action of the pivoted runner unit.

By referring to the drawings and Figures 1, 2 and 3 in particular it will be seen that a sled has been disclosed which comprises a top 10 preferably formed of a plurality of slats and mounted in assembled relation on a plurality of cross members 11, 12 and 13, respectively. The slats of the top 10 are riveted or bolted or otherwise suitably affixed to the cross members 11, 12 and 13 to form an integral unit. The top 10 of the sled has affixed thereto, as by welding, a fixed runner unit 14, the forward portion of which defines a U-shaped curve 15 which is bent upwardly and the upper foremost portion thereof welded or otherwise affixed to the cross member 12 at a point 16.

The rearmost portion of the runner unit 14 is bent backwardly upon itself in a pair of reverse bends 17 and then defines a curve 18 connecting the two side portions of the runner unit 14 to one another in the same manner as the U-shaped curve 15 connects the front portion of the runner unit. This construction is advantageous in that it is relatively simple to form on appropriate jigs and fixtures and it is self-supporting with respect to the seat of the sled and it may be welded directly to the cross pieces 12 and 13. The central forwardmost point of the curve 18 is welded as at 19 to the cross piece 13. Another advantage in this construction is that there are no sharp pointed runner ends on this unit of the sled. The runner unit 14 comprising the two side runners interconnected by the curving members 15 and 18 and affixed directly to the seat 10 forms an integral structure therewith and under normal conditions supports more than half of the weight positioned on the seat 10. The foremost extending portion of the seat 10 which includes the cross piece 11, has a centrally located pivot therein and a secondary runner unit pivotally affixed thereto. The secondary runner unit comprises a U-shaped runner 20, the arms of the U-shape forming the ground engaging runners and the connecting portion thereof being upturned and transversely curved as indicated by the numeral 21. A steering bar is affixed to the uppermost and foremost point of the upwardly and transversely curved member 20 and is indicated by the numeral 22. Rubber or other molded material in the form of handgrips 29 are provided on the ends of the steering bar 22 and these include annular grooves 30 about which a rope or cord may be affixed so that the bobsled may be pulled thereby.

A pair of arched frame members 23 are also affixed to the side or runner portions of the secondary runners 20 at their outermost ends and their uppermost central portions are affixed as by welding to a plate 24 which in turn is pivotally mounted beneath the cross piece 11 on a pivot 25. The arched frame members 23 are inclined inwardly toward each other as best shown in Figures 1 and 3 of the drawings and form with the U-shaped runner 20 a suitable steerable runner unit.

In order that the secondary runner unit 20 may be held in axial alignment with the runners 14 of the sled, a coil spring 26 is affixed to an extension 27 of the runner unit 20 and to an extension 28 attached to the cross piece 12 of the sled. Thus when the secondary runner unit 20 is turned upon the pivot 25, the spring 26 is extended as it normally holds the secondary runner unit 20 in axial alignment with the runner 14 of the sled.

In Figure 5 of the drawings the turning action is illustrated and it will be observed that the length of the extension 27 is sufficient so that it moves the forward end of the spring 26 out of axial alignment with the sled proper and thereby enables the coil spring 26 to return the secondary runner unit 20 to axial alignment with the remainder of the sled when it is permitted to do so. The complete bobsled thereby comprises a single body portion 10 with a fixed runner unit 14 forming spaced parallel ground engaging runners underlying slightly more than half of the sled body 10 and the pivoted secondary runner unit 20 which partially underlies the forward end of the body 10. The construction is simple and requires a minimum of material and results in a very light weight sled which possesses the unusual steering ability imparted by reason of the pivoted front section. The runners may be formed of any desired configuration such as tubular members with rounded bottom surfaces, tubular members with flattened bottom surfaces, and, as shown in the drawings, inverted T-shaped members, the ground engaging portions of which are provided with axially extending grooves to afford a minimum of metallic contact with the ground. In Figure 4 of the drawings a cross section of the inverted T-shaped grooved runner is illustrated.

It will be seen that the several parts may be simply and inexpensively fabricated on suitable jigs and fixtures and that when in assembled relation, as shown in the drawings, they form a unique sled construction which is a very attractive toy and practical sled as well.

Having thus described my invention, what I claim is:

A bobsled comprising a seat member formed of a plurality of cross pieces and a plurality of slats positioned thereon and affixed thereto, a pivot member affixed beneath one of the said cross pieces and a movable runner unit mounted beneath the said pivot member, the said runner unit including a U-shaped runner member, the arms of which are spaced apart and a U portion of which is upwardly curved, a steering bar affixed to the said upwardly curved portion of the runner unit and lying on the same plane as the said seat member, a fixed runner unit attached beneath said cross pieces, said fixed runner unit disposed behind the said movable runner unit and including spaced runners having upturned ends forming connections with the said cross pieces, a rearward projection formed on the said movable runner unit and a forwardly extending projection formed on one of the said cross pieces and a coil spring positioned between the said projections and normally holding the said movable runner unit in axial alignment with the said fixed runner unit.

RALPH WARRENDER.

REFERENCES CITED

The following references are of record in the file of this patent:

UNITED STATES PATENTS

| Number | Name | Date |
|---|---|---|
| 188,353 | Gilzinger | Mar. 13, 1877 |
| 1,197,084 | Walter | Sept. 5, 1916 |
| 1,216,009 | Takemi | Feb. 13, 1917 |
| 1,224,575 | Sherwood | May 1, 1917 |